United States Patent
Porter et al.

(10) Patent No.: US 10,735,258 B2
(45) Date of Patent: Aug. 4, 2020

(54) SYSTEM FOR SELF-ALLOCATING RESOURCES

(71) Applicant: Avaya Inc., Santa Clara, CA (US)

(72) Inventors: Kezzia Porter, County Galway (IE); Edel Kelly, County Galway (IE); Paul Delaney, County Galway (IE); Danushka Migel Wasam, Galway (IE)

(73) Assignee: Avaya Inc., Santa Clara, CA (US)

(*) Notice: Subject to any disclaimer, the term of this patent is extended or adjusted under 35 U.S.C. 154(b) by 45 days.

(21) Appl. No.: 16/043,452

(22) Filed: Jul. 24, 2018

(65) Prior Publication Data

US 2020/0036588 A1    Jan. 30, 2020

(51) Int. Cl.
| | | |
|---|---|---|
| *H04L 12/24* | (2006.01) | |
| *H04L 12/911* | (2013.01) | |
| *H04L 12/919* | (2013.01) | |
| *G06F 11/34* | (2006.01) | |
| *H04L 12/18* | (2006.01) | |

(52) U.S. Cl.
CPC ...... *H04L 41/0816* (2013.01); *G06F 11/3409* (2013.01); *H04L 41/0672* (2013.01); *H04L 41/0859* (2013.01); *H04L 47/743* (2013.01); *H04L 47/765* (2013.01); *H04L 47/822* (2013.01)

(58) Field of Classification Search
CPC . H04L 41/0816; H04L 47/765; H04L 47/822; H04L 47/743; H04L 41/0859; H04L 41/0672; G06F 11/3409
See application file for complete search history.

(56) References Cited

U.S. PATENT DOCUMENTS

| | | | | |
|---|---|---|---|---|
| 8,478,819 B1* | 7/2013 | Kornbluh | ............ | H04L 12/1818 370/260 |
| 8,634,543 B2 | 1/2014 | Flockhart et al. | | |
| 8,811,597 B1* | 8/2014 | Hackbarth | ....... | G06Q 10/06393 379/266.08 |
| 9,516,169 B2 | 12/2016 | Reilly et al. | | |
| 2004/0001446 A1 | 1/2004 | Bhatia et al. | | |
| 2006/0128355 A1 | 6/2006 | Aaron | | |

(Continued)

FOREIGN PATENT DOCUMENTS

WO    WO 2007/011598    1/2007

OTHER PUBLICATIONS

Extended Search Report for European Patent Application No. 19187492.4, dated Oct. 22, 2019 8 pages.

(Continued)

*Primary Examiner* — Arvin Eskandarnia
*Assistant Examiner* — Chhian (Amy) Ling
(74) *Attorney, Agent, or Firm* — Sheridan Ross P.C.

(57) ABSTRACT

Complex systems, such as those comprising processing, data storage, and communication resources for processing a plurality of communication and data processing events and types of events, are often caught unaware of outside events or how to respond to such outside events. Providing a system that self-configures in response to external events enables such systems to be proactive in their operations to address increased activity and/or types of activity in response to an external event. The system then self-evaluates, which may identify overages or shortfalls, such that the system self-learns and response more appropriately over time.

20 Claims, 4 Drawing Sheets

(56) References Cited

U.S. PATENT DOCUMENTS

| | | |
|---|---|---|
| 2008/0126990 A1 | 5/2008 | Kumar et al. |
| 2008/0133300 A1 | 6/2008 | Jalinous |
| 2010/0235218 A1 | 9/2010 | Erhart et al. |
| 2010/0296417 A1 | 11/2010 | Steiner |
| 2011/0125793 A1 | 5/2011 | Erhart et al. |
| 2011/0125826 A1 | 5/2011 | Erhart et al. |
| 2014/0177819 A1 | 6/2014 | Vymenets et al. |
| 2014/0229560 A1 | 8/2014 | Gray |
| 2014/0241299 A1* | 8/2014 | Zhao ................... H04L 47/765 370/329 |
| 2017/0075749 A1* | 3/2017 | Ambichl ............... G06F 11/079 |
| 2019/0044802 A1* | 2/2019 | Gibbon ............... G06F 9/45558 |

OTHER PUBLICATIONS

Extended Search Report for European Patent Application No. 19198283.4, dated Oct. 29, 2019 9 pages.

\* cited by examiner

SYSTEM FOR SELF-ALLOCATING RESOURCES

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for system resource management and particularly to the processing, data storage, and communication resources utilized by the system.

BACKGROUND

Complex systems, such as those utilizing communication, data processing, storage, task routing, and other components, are often subject to irregular demand. While some events may be expected others are not. When unexpected events occur around the world, the events may impact a system abruptly. For example, a natural disaster in a popular holiday destination or a terrorist attack may occur. As a result, a system may be overwhelmed with activity due to the sudden increase on those impacted and seeking information or action via the system. The system may be unprepared and manual efforts required to enable the system to address the sudden spike in activity. Such efforts require time to assess, devise a solution, and implement the solution on the system. All during an event when time may be of critical importance.

SUMMARY

These and other needs are addressed by the various embodiments and configurations of the present invention. The present invention can provide a number of advantages depending on the particular configuration. These and other advantages will be apparent from the disclosure of the invention(s) contained herein. Accordingly, systems and methods are provided to proactively detect, analyze, and solve known and new problems based on the solutions of known similar past problems based on information and conditions detected prior to a surge in contact center activity.

In one embodiment, a system is disclosed, comprising a plurality of resources, wherein at least a portion of the plurality of recourses comprise a least one of a computer resource comprising a first microprocessor and a first memory for storing instructions for execution by the microprocessor, a communication resource comprising a network interface to a network and selectively enabling communications between a first and second endpoint utilizing the network, or a data storage resource, and wherein the plurality of resources are interconnected for communications therebetween and enable the first endpoint to obtain or provide data to the second endpoint; an event monitor comprising a network interface, microprocessor, and memory for storing instructions for execution by the microprocessor and wherein the event monitoring component is configured to obtain event information from an event source regarding an event; an event assessment processor, comprising a microprocessor and memory for storing instructions for execution by the microprocessor and wherein the event assessment component is configured to determine whether if the obtained event information matches a historic event in the data storage resource; and an event response processor, comprising a microprocessor and memory for storing instructions for execution by the microprocessor and wherein the event response processor is configured to reconfigure the system in accordance with a solution determined from a historic solution associated with the historic event.

In another embodiment, a method is disclosed, comprising: utilizing a plurality of resources to provide connectivity between a first and second endpoint, wherein at least a portion of the plurality of recourses comprise a least one of a computer resource, each of the at least one computer resource comprising a first microprocessor and a first memory for storing instructions for execution by the microprocessor, a communication resource comprising a network interface to a network and selectively enabling communications utilizing the network, or a data storage resource, and wherein the plurality of resources are interconnected for communications therebetween and selectively enable the first endpoint to obtain or provide data to the second endpoint; obtaining event information from an event source regarding an event; determining whether the obtained event information matches a historic event; and automatically reconfiguring the resources in accordance with a solution determined from a historic solution associated with the historic event.

In another embodiment, a system is disclosed, comprising: a plurality of resources, wherein at least a portion of the plurality of recourses comprise a least one of a computer resource comprising a first microprocessor and a first memory for storing instructions for execution by the microprocessor, a communication resource comprising a network interface to a network and selectively enabling communications between a first and second endpoint utilizing the network, or a data storage resource, and wherein the plurality of resources are interconnected for communications therebetween and enable the first endpoint to obtain or provide data to the second endpoint; means to obtain event information from an event source regarding an event; means to determine whether if the obtained event information matches a historic event in the data storage resource; and means to reconfigure the resources in accordance with a solution determined from a historic solution associated with the historic event.

Systems and methods are provided to proactively detect, analyze, and solve new problems based on one or more prior solutions to one or more prior events requiring re-allocation of resources.

While systems, such as contact centers, may define success in terms of efficient use of resources and customer satisfaction, the success with one may be at the expense of the other. For example, minimal resources may be utilized but produce minimal customer satisfaction. Alternatively, a contact center can be over allocated resources, such as to accommodate the highest utilization possible, but with unused resources, which themselves take material and other resources to maintain even when idle (e.g., security monitoring, staffing, electricity usage, address utilization, port utilization, etc.). Accordingly, systems, such as contact centers, are often well equipped to allocate resources (human, data processing, communication, etc.) for historic peaks and troughs of activity. However, the unexpected often happens. The event itself, the timing, the location, and/or the severity of the event may be unexpected and the system unprepared for a sudden spike in resource utilization.

Preventing shortfalls associated with a contact center may be provided by creating a contact center decision support system (DSS) that is proactive to unexpected external events. The DSS may access and utilize case-based reasoning to retrieve, reuse, revise, and retain solutions for unexpected events that generate contact center impact. The impact on the contact center may be within normal operating parameters, and processed by other means, or significant, which may be defined as one or more key metrics are outside of acceptable operational parameters. For example, it may be acceptable for an average wait time to connect a communication comprising a voice call from a customer to an agent to be three minutes, but acceptable to be up to five minutes if experienced by fewer than fifteen percent of the callers. However, anything longer than five minutes, or greater than three minutes for more than fifteen percent of the callers requires action to reduce the wait time back to an acceptable level. The deallocation threshold may be the same, such as in the preceding example, once the wait time is down to three minutes or up to five minutes for no more than fifteen percent of the callers, the resources newly allocated to address the unacceptable wait time may be deallocated. However, deallocation may have a different threshold, such as one minute generally and no more than two minutes for twenty percent of the callers, before the newly allocated (or other) resources are deallocated.

However, the unexpected occurs. It should be appreciated that the term "unexpected" may be an event never before encountered or a known event or type of event, but the timing, location, severity, and/or other factors cannot be anticipated in advance. For example, it is an unfortunate reality that terrorist activities occur. The perpetrators are clandestine actors who strike unexpectedly. As a result, while it is reasonable to assume terrorist strikes will occur the timing, location, severity, etc., cannot. The system, whether providing support for emergency services or airlines receiving travel cancellations, may be unprepared to handle an influx of activity. In another example, bad weather (e.g., hurricane, tornado, rain-induced flooding, etc.) may occur at least partially predictably for a particular location and time of year. However, while some storms are of limited severity, such that they are little more than a minor and short-lived inconvenience, while others have a severity that the impact is catastrophic and long-term.

In one embodiment, a case-based reasoning solution is provided comprising systems and methods for proactively detecting and solving known and new problems based on the solutions of known similar past problems. The systems may include policies and actions including retrieve, reuse, revise, and retain. The solution, when applied, will reconfigure contact center resources (e.g., hardware, methodologies, routing, etc.) automatically to maintain an acceptable service level. The solution is determined based on past events previously stored as a solution for a past similar happening. A selected solution can be automatically applied and administrators can intervene and regain manual control/override. Reapplying previous behaviors, the CC may react to previous triggers with a particular solution with iterative fine-tuning.

Examples of sources of events that may be monitored by the system include, weather, news, social media, finance, targeted websites (e.g., emergency services, site-specific, event specific, etc.), and/or certain object(s) (e.g., internet-of-things, weather stations, water level reporting stations, etc.).

When the system detects a candidate event a proactive response may be initiated. The proactive response may include one or more of retrieving stored events and their associated solutions, analyze the stored events to determine similarity to the candidate event, select a solution associated with the stored event that most closely matches the candidate event, and update the solutions in accordance with candidate event and the actions taken and the actual impact on the system and any under/over allocations that were observed.

Events will rarely, if ever, be identical. However, there will be similarities that impact the system. In one embodiment, the existing solutions may be sorted, ranked, or otherwise ordered in terms of similarity to a candidate event. In another embodiment, a k-nearest-neighbor determines the similarity of the candidate event to a stored event or event classification. The system then selects the solution associated with the closest matching event. If the event is a plurality of events, a weighted average of the solutions may be implemented. Additionally or alternatively, the solution may be modified based on any difference(s) between the candidate event and the closest matching event. When the base of event-solutions is or becomes sufficiently large, other selection means may be provided (e.g., specific index structures such as kd-trees, case-retrieval nets, discrimination networks, etc.).

When the system detects a candidate event and retrieves stored events and their solutions, the system is operable to choose: a best fit solution from a plurality of solutions, adapt a best fit solution by modifying one or more existing solutions based on parameter analysis of the candidate and/or stored events and their solutions, and/or reuse a retrieved solution unmodified for implementing, such as when the match between the candidate event and a particular stored event is or is substantially the same.

A solution may be selected for implementation comprising one or more of: automatic notification to administrators and agents, reassignment of agents, streamlining of business processes, changing interactive voice response (IVR) parameters (e.g., music, messages, options, etc.), summons additional agents for work, auto-provisioning of additional trunks, auto-on powering of additional servers for load balancing, auto-on sentiment monitoring, outbound campaign initiation/termination, automatic rerouting based on customer needs and additional events/details, execution of any additional pre-defined rules, and/or other solutions or combinations thereof.

Once implement and the event has passed, a solution may be determined to be successful if the system experienced no parameter changes outside an acceptable range for a particular metric. However, the system can evolve and become more intelligent and responsive as more incidents are detected and events and solutions are added. For example, if a solution was implemented and a particular metric was unmet, such as incoming voice calls were refused (busy signal), the event and solution may be identified as insufficient so that the solution, once populated into a database or other storage, if selected as a potential solution for a future candidate event will impact the solution for the future candidate event accordingly. For example, if the future candidate event is determined to be identical (in terms of impact to the system) to the stored event and the associated solution was to allocate an additional twenty percent of the resources utilized for voice communications (e.g., trunk, switches, routers, IVR, etc.), the future candidate event may implement a solution whereby an additional thirty percent of the resources utilized for voice communications are allocated. The amount of additional increase may be determined by analysis of the stored solution and an analysis during implementation, for example, if the number of refused calls is known, then additional resources—beyond those implemented in the stored solution—may be allocated such as to handle the known number of refused calls that occurred during the prior event.

The system will be more intelligent and accurate as more events are detected and their associated solutions implemented and assessed. The system may self-improve ("learn") by one or more of: analyzing the service level maintained throughout the period of the event, determining the occurrence and/or severity of spikes in calls waiting, and if so, how many and how quickly were they resolved, determining if IVR messages fulfilled their task of rerouting customers to other sources of information (e.g., websites), determine if any hardware failures/deficiencies occurred due to the increase in activity, determine if any hardware allocated as part of a solution was properly configured for performing the tasks needed, and/or assessing the event and the response for retention and to enable future consideration.

In another embodiment, the system may learn how it impacts the system. For example, a change may be selected having a particular impact. Upon implementing the change, the system may be evaluated to see if the observed impact and the expected impact are the same, or at least substantially so. If the change produces an unexpected result (e.g., more of a desired result than expected, less of the desired result than expected, a result different from that what was expected, etc.), then the system may self-learn that a particular solution requires other modification so as to produce the expected result. For example, a particular reallocation of voice channels to data channels may be expected to increase an overall resolution rate by 10% while only increasing average wait time on the voice channels by 5%. If such solution is selected and implemented but observed to increase the resolution rate by 20%, then a future iteration seeking a 10% increase, may select reallocating half the number of voice channels to data channels, as compared to the first iteration. If there were other effects, positive or negative, such as an accompanying increase in voice channel wait time by 15% (generally a negative effect), then if such an increase is outside a previously determined guideline, then an additional aspect of the solution may be selected and implemented to keep the average voice channel wait time from reaching an unacceptable level.

In another embodiment, the system is a case-based reasoning solution, so the system is operable to: add data to the learning phase of the system and/or add details and revise events and solutions in the database.

In addition to the system detecting and acting on events, the administrators can quickly respond. In an additional embodiment, the administrators may be provided manual overrides to effectively respond to or not respond to certain events and provide input to the learning system when a selected event and/or solution is observed and determined to be in error for a candidate event.

The term "events," or "event" when used in the singular, as used herein, refer to incidences external to the subject system, such as a contact center, that the occurrence thereof is neither caused, avoided, nor mitigated by any action to or by the subject system. The occurrence of an event is entirely outside the influence of the subject system. The subject system is limited to responding to events, such as determining that an event has occurred and responding to, or in advance of, the system's operational variations that may result from the event. Events may be variously embodied and include one or more of natural acts (e.g., weather, earthquake, tsunami, volcano, etc.), terrorist act (e.g., actual or threatened harm to a civilian or civilian population), outbreak of war, riot, or civil strife, infrastructure failures or impairment (e.g., road, air, or rail impairment, cyber-attack, power outage, communication outage, etc.), and/or public or private entity's failure to perform business as usual (e.g., bankruptcy of a rail company or airline, government upheaval, labor strike, etc.), a public or private entity's unexpected announcement (e.g., location of a sporting event or concert), etc. As used herein, "events" expressly exclude acts or circumstances that are caused, avoided, or mitigated by the system, a component comprising the system, and/or the operation or management thereof.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
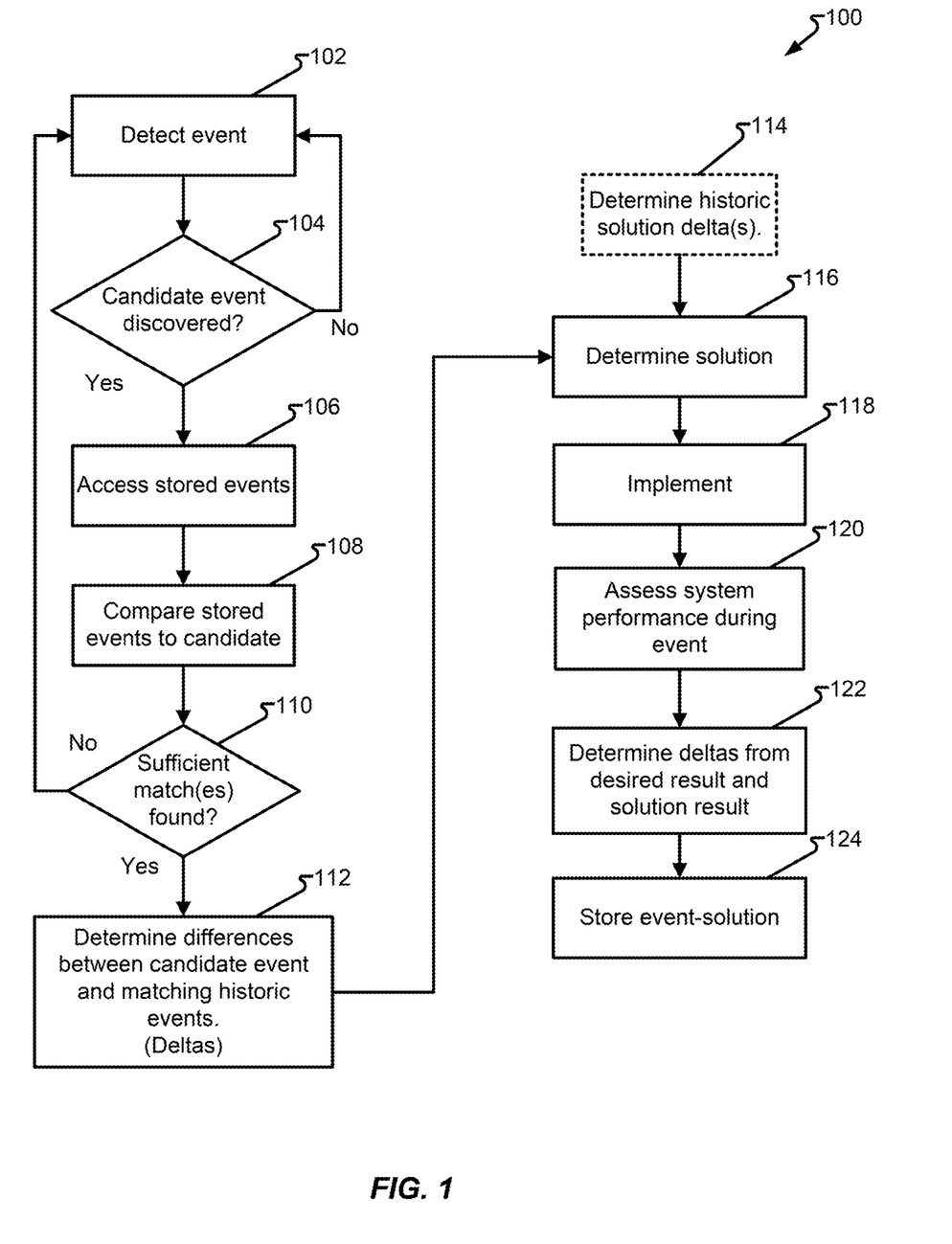
FIG. 1 depicts a process in accordance with embodiments of the present disclosure.

FIG. 1 depicts process 100 in accordance with embodiments of the present disclosure. In one embodiment, process 100 is executed by a processor (i.e., microprocessor) or a collection of processors, as will be described more completely with respect to FIG. 3. In one embodiment, process 100 starts at step 102, however, once started, process 100 may run perpetually (e.g., step 124 directly precedes step 102) or until the process is terminated. Process 100 may be implemented to monitor a system, such as a contact center, having a plurality of resources (e.g., processing resources, data storage resources, and/or communication/connectivity resources).

In one embodiment, step 102 detects events. Not all events will impact the operation of the system and, test 104, determines of an event is a candidate event. Test 104 may be determined in the negative, such as when the event detected in step 102 is irrelevant or of a de minimums severity, to require action by the system. If test 104 is determined in the negative, process 100 may return to step 102 to detect the next event. If test 104 is determined in the affirmative, processing may continue to step 106, whereby stored or historical events may be accessed. Step 108 compares the stored event to the candidate event and test 110 determine if a match is found to a stored event.

It should be appreciated that events that are not determent to be candidate events may be determined by a positive match to a non-event record. Additionally or alternative, events that are newly encountered, such as upon the first iteration of process 100, may be processed as a generic candidate event whereby step 116 determines a default solution.

In one embodiment, if no match is found in test 110, processing may continue back to step 102 to detect the next event. In another embodiment, a closest match may be found from a plurality of stored candidate events (e.g., test 110, if determined in the negative, resumes processing back at step 108 to compare the candidate event to the next stored event). In such an embodiment, the closest match is then selected or if no match, within a reasonable proximity is found, then process 100 may return to step 102. Steps 108 and/or step 110 may utilize a k-nearest neighbor to determine a closest proximity to a stored event and/or event category.

If test 110 is determined in the affirmative, step 112 then determines differences between the historic event or events and the candidate event (e.g., deltas). Differences may be one of time, location, severity, etc. For example, an earthquake at a popular tourist destination, during the off-season will have a different impact than during the height of the season. Planning for travel, which may occur during the off-season may be highly impacted versus actual travel. Conversely, during the height of the season, planning may be minimally affected but greatly impact actual travel. Next step 116 determines a solution. Optionally, step 114 may determine historic solution deltas. For example, a historic event may have caused an increase in telephone-based cancellations by 45%. A candidate event that is, for example, determined in step 112 to have a lessor severity (e.g., a severity delta) of half may be expected to have an effect of approximately one-half of the historic event, or 22½%. Accordingly, step 114 may then indicate a solution delta of one-half of what was, or should have been, allocated to accommodate the increase in telephone-based cancellations of the historic event. For example, if in response to the historic event, telephone traffic was routed to a dedicated IVR to process cancellations and connections to agent staffing increased by 10%, then a historic solution delta of ½ that of the historic event may then indicate a similar IVR be allocated and connections to agent staffing increased by 5% as solution case. Step 114 may utilize a k-nearest neighbor to find a closest match. For example, a weather-caused natural disaster at a vacation resort may be more closely related to an earthquake-caused natural disaster at a different vacation resort, as opposed to a weather-caused natural disaster in a seldom visited location.

Step 116 may also divert communications from/to a first endpoint, associated with a customer, and connected to a second endpoint of the system configured for one type of communication (e.g., agent endpoint configured for voice and/or video communications) to a third endpoint of the system configured for different type of communication (e.g., voicemail, IVR, agent endpoint configured for text communications).

Additionally or alternatively, step 112 and/or step 114 may be restricted to a particular domain. For example, if the system is utilized to schedule and manage air travel, a candidate event that disrupts rail travel may have a similar impact, which may be further adjusted via determination of deltas in step 112 and/or 114. For example, an historic airline strike that affect a wide segment of the traveling public (one domain) and a candidate event, disruption of a rail line may affect a narrower segment of the traveling public. However, a power outage (a different domain) may affect an, at least a partially, overlapping segment of the traveling public, and have a delta selected accordingly.

Next step 118 implements the solution. Step 118 may allocate hardware not currently allocated, such as by "spinning up" servers, allocating switch ports for telephony connections, a trunk line established, etc. Additionally or alternatively, hardware may be reconfigured. For example, a voice prompt may be altered to present an option addressing the candidate event. A decision tree may be altered to allow callers to connect to an agent upon being presented with more, fewer, or different prompts. Communications to agents (e.g., allocation notifications for work shifts, alternate type of work, etc.) may also be provided and, additionally or alternatively, endpoints associated with an agent allocated and/or configured to address the candidate event.

In another embodiment, step 118 may proactively address the impact of the candidate event on the system. For example, step 114 may determine a number of end-customers (e.g., travelers) will require information. Step 118 may proactively contact the number of end-customers, such as with an email or text message, which may reduce the utilization of components utilized to process incoming calls, as well as improve customer satisfaction. Additionally or alternatively, outbound voice calls may be configured and implemented to deliver a recorded message and/or connect a customer's endpoint to an endpoint of a resource (see, FIG. 2, item 212).

Step 120 may be executed following step 118 or in parallel to assess system performance during the candidate event and the attempts to mitigate the impact on the system that result from the candidate event. For example, it may become known that inbound callers where receiving a "busy signal" or placed on hold for an unacceptably long period of time. Step 122 may then determine deltas between the desired result and the observed result. Continuing the example, additional telephony connections may have been needed and/or additionally non-telephony connections (e.g., IVR, outbound telephony, outbound text, etc.) may have been utilized to reduce the load on the inbound telephony components. Step 122 may also consider whether additionally allocated hardware (e.g., telephony equipment, switches, etc.) and/or reconfigured components were appropriately configured. For example, an IVR, absent the candidate event, may have presented a caller with many options and sub-options and after a number of selections reach information on canceling a flight. In response to a candidate event affecting air travel step 118 may have reconfigured the IVR incorrectly. It may have been expected that the reconfigured IVR would place a trip cancelation option at the root menu of the IVR but, due to an error, removed it. As a result, the IVR system was overutilized, as callers hunted for a now absent option, and voice circuitry overutilized as callers required access to an agent.

Step 124 then stores the solution and, if not otherwise stored, the candidate event such that the candidate event and solution becomes part of the pool of historic events considered in a future interaction of step 106, 108, 110, and/or 112 as well as the solution added to the pool of solutions for consideration in future iteration of step 114, 116, 118, 120, and/or 122.

In another embodiment, an event detected in step 102 may have a known duration or, if unknown, a subsequent iteration of test 104 may determine the event has diminished or passed. Accordingly, a solution selected in step 116 and implemented in step 118 may be reduced or discontinued as the event diminishes and thereby allow the system to, gradually or suddenly, return to the state as it existed prior to execution of step 118.

Figure 2:
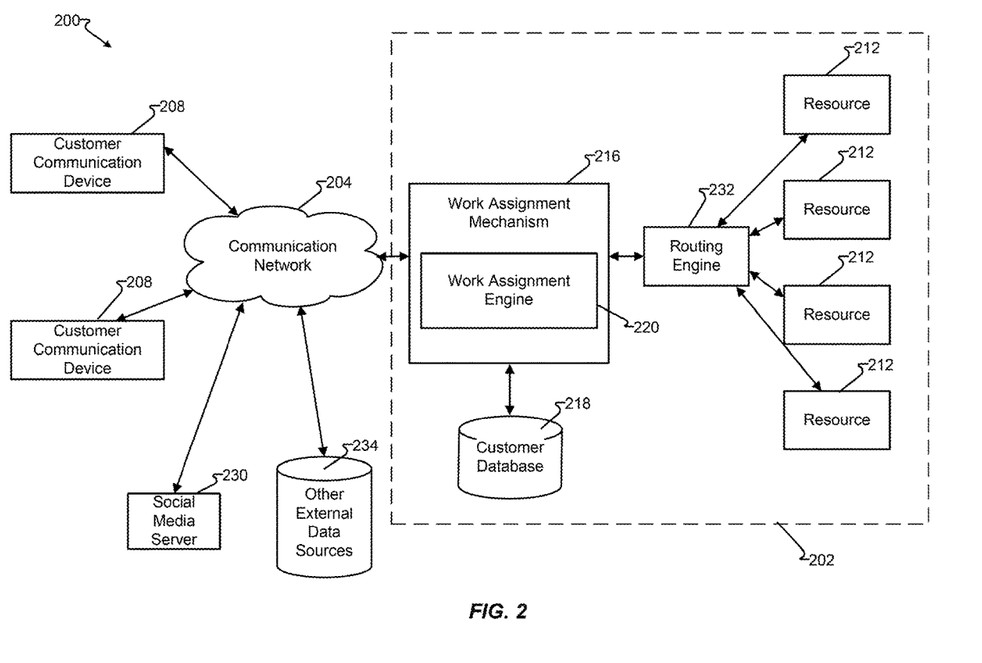
FIG. 2 depicts a system in accordance with embodiments of the present disclosure.

With reference now to FIG. 2, networked components 200 is discussed in accordance with at least some embodiments of the present disclosure. The networked components 200 may be a distributed system and, in some embodiments, comprises a communication network 204 connecting one or more communication devices 208 to a work assignment mechanism 216, which may be owned and operated by an enterprise administering contact center 202 in which a plurality of resources 212 is distributed to handle incoming work items (in the form of contacts) from customer communication devices 208.

A system, such as contact center 202, may be variously embodied to receive and/or send messages that are or are associated with work items and the processing and management (e.g., scheduling, assigning, routing, generating, accounting, receiving, monitoring, reviewing, etc.) of the work items by one or more resources 212. The work items are generally generated and/or received requests for a processing resource 212 embodied as, or a component of, an electronic and/or electromagnetically conveyed message. Contact center 202 may include more or fewer components than illustrated and/or provide more or fewer services than illustrated. The border indicating contact center 202 may be a physical boundary (e.g., a building, campus, etc.), legal boundary (e.g., company, enterprise, etc.), and/or logical boundary (e.g., resources 212 utilized to provide services to customers for a customer of contact center 202).

Furthermore, the border illustrating contact center 202 may be as-illustrated or, in other embodiments, include alterations and/or more and/or fewer components than illustrated. For example, in other embodiments, one or more of resources 212, customer database 218, and/or other component may connect to routing engine 232 via communication network 204, such as when such components connect via a public network (e.g., Internet). In another embodiment, communication network 204 may be a private utilization of, at least in part, a public network (e.g., VPN); a private network located, at least partially, within contact center 202; or a mixture of private and public networks that may be utilized to provide electronic communication of components described herein. Additionally, it should be appreciated that components illustrated as external, such as social media server 230 and/or other external data sources 234 may be within contact center 202 physically and/or logically, such as to mirror externally collected data, but still be considered external. Additionally or alternatively, contact center 202 may operate social media server 230 (e.g., a web site operable to receive user messages from customers and/or resources 212) as one means to interact with customers via their customer communication device 208. External data sources 234 and/or social media server 230 may be websites, database, API's of other components, or other sources whereby events may be detected. External data sources 234 may include, but is not limited to, weather, news, governmental agencies, social media (as a component of social media server 230 and/or other social media sources), IoT devices (e.g., flood, snowpack, seismic, and/or power outage sensors, cameras, etc.), and/or other sources selected to provide event information, such as to step 102.

An endpoint may be embodied as one or more customer communication devices 208, which are further embodied as external to contact center 202 as they are under the more direct control of their respective user. However, embodiments may be provided whereby one or more customer communication devices 208 are physically and/or logically located within contact center 202 and are still considered external to contact center 202, such as when a customer utilizes customer communication device 208 at a kiosk and attaches to a private network of contact center 202 (e.g., WiFi connection to a kiosk, etc.), within or controlled by contact center 202.

It should be appreciated that the description of contact center 202 provides at least one embodiment whereby the following embodiments may be more readily understood without limiting such embodiments. Contact center 202 may be further altered, added to, and/or subtracted from without departing from the scope of any embodiment described herein and without limiting the scope of the embodiments or claims, except as expressly provided.

Additionally, contact center 202 may incorporate and/or utilize social media website 230 and/or other external data sources 234 may be utilized to provide one means for a resource 212 to receive and/or retrieve contacts and connect to a customer via their endpoint (customer communication device 208). Other external data sources 234 may include data sources, such as service bureaus, third-party data providers. Customers may utilize their respective customer communication device 208 to send/receive communications utilizing social media server 230.

In accordance with at least some embodiments of the present disclosure, the communication network 204 may comprise any type of known communication medium or collection of communication media and may use any type of protocols to transport electronic messages between endpoints. Communication components may require allocation and/or configuration to provide a certain volume and/or types of communications (e.g., POTS, voice-over-IP, email, text, video, etc.). The communication network 204 may include wired and/or wireless communication technologies. The Internet is an example of the communication network 204 that constitutes an Internet Protocol (IP) network consisting of many computers, computing networks, and other communication devices located all over the world, which are connected through many telephone systems and other means. Other examples of the communication network 204 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 204 need not be limited to any one network type and instead may be comprised of a number of different networks and/or network types. As one example, embodiments of the present disclosure may be utilized to increase the efficiency of a grid-based contact center 202. Examples of a grid-based contact center 202 are more fully described in U.S. Patent Publication No. 2010/0296417 to Steiner, the entire contents of which are hereby incorporated herein by reference. Moreover, the communication network 204 may comprise a number of different communication media, such as coaxial cable, copper cable/wire, fiber-optic cable, antennas for transmitting/receiving wireless messages, and combinations thereof.

The communication devices 208 may correspond to a customer's endpoint. In accordance with at least some embodiments of the present disclosure, a customer may utilize their communication device 208 to initiate a work item. Illustrative work items include, but are not limited to, a contact directed toward and received at a contact center 202, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 204. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 216, but rather may be on some other server in the communication network 204 where it is harvested by the work assignment mechanism 216, which generates a work item for the harvested communication, such as social media server 230. An example of such a harvested communication includes a social media communication that is harvested by the work assignment mechanism 216 from a social media network or server 230. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 208 and the format of the communication. In particular, work items are logical representations within a contact center 202 of work to be performed in connection with servicing a communication received at contact center 202 (and, more specifically, the work assignment mechanism 216). The communication may be received and maintained at the work assignment mechanism 216, a switch or server connected to the work assignment mechanism 216, or the like, until a resource 212 is assigned to the work item representing that communication. At which point, the work assignment mechanism 216 passes the work item to a routing engine 232 to connect the communication device 208, which initiated the communication, with the assigned resource 212.

Although the routing engine 232 is depicted as being separate from the work assignment mechanism 216, the routing engine 232 may be incorporated into the work assignment mechanism 216 or its functionality may be executed by the work assignment engine 220. Routing engine 232, work assignment mechanism 216, and/or work assignment engine 220 may comprise hardware (e.g., switches, routers, servers, ports, etc.) that may be allocated, such as by "waking" idle components and/or de-allocating such components currently being utilized for other tasks. Routing engine 232, work assignment mechanism 216, and/or work assignment engine 220 may comprise hardware located at more than one location, such as requiring an allocation of management hardware and/or inter-hardware communications equipment. Additionally or alternatively, hardware may be configured or reconfigured as at least a portion of a strategy to address a particular candidate event. For example, an endpoint associated with additional resources 212 may be configured to address particular issues known or anticipated in response to the event. One type of resource 212 may be reconfigured, in whole or in part, such as to implement outbound dialing/messaging as opposed to otherwise being utilized for inbound call/messaging processing. For example, an inbound service may be configured to have a longer wait-time in queue for processing to enable components to be available or configured to provide an increased dialing/messaging rate for outbound calls/messages.

In accordance with at least some embodiments of the present disclosure, the communication devices 208 may comprise any type of known communication equipment or collection of communication equipment. Examples of a suitable communication device 208 include, but are not limited to, a personal computer, laptop, Personal Digital Assistant (PDA), cellular phone, smart phone, telephone, or combinations thereof. In general, each communication device 208 may be adapted to support video, audio, text, and/or data communications with other communication devices 208 as well as the processing resources 212. The type of medium used by the communication device 208 to communicate with other communication devices 208 or processing resources 212 may depend upon the communication applications available on the communication device 208.

In accordance with at least some embodiments of the present disclosure, the work item is sent toward a collection of processing resources 212 via the combined efforts of the work assignment mechanism 216 and routing engine 232. The resources 212 can either be completely automated resources (e.g., Interactive Voice Response (IVR) units, microprocessors, servers, or the like), or a connection to an endpoint operated by an agent.

As discussed above, the work assignment mechanism 216 and resources 212 may be owned and operated by a common entity in a contact center 202 format. In some embodiments, the work assignment mechanism 216 may be administered by multiple enterprises, each of which has its own dedicated resources 212 connected to the work assignment mechanism 216.

In some embodiments, the work assignment mechanism 216 comprises a work assignment engine 220, which enables the work assignment mechanism 216 to make intelligent routing decisions for work items. In some embodiments, the work assignment engine 220 is configured to administer and make work assignment decisions in a queueless contact center 202, as is described in U.S. patent application Ser. No. 12/882,950, the entire contents of which are hereby incorporated herein by reference. In other embodiments, the work assignment engine 220 may be configured to execute work assignment decisions in a traditional queue-based (or skill-based) contact center 102.

The work assignment engine 220 and its various components may reside in the work assignment mechanism 216 or in a number of different servers or processing devices. In some embodiments, cloud-based computing architectures can be employed whereby one or more components of the work assignment mechanism 216 are made available in a cloud or network such that they can be shared resources among a plurality of different users. Work assignment mechanism 216 may access customer database 218, such as to retrieve records, profiles, purchase history, previous work items, and/or other aspects of a customer known to contact center 202. Customer database 218 may be updated in response to a work item and/or input from resource 212 processing the work item.

In another embodiment, one or more components of contact center 202 may be implemented in a cloud-based architecture in their entirety, or components thereof (e.g., hybrid), in addition to embodiments being entirely on-premises. In one embodiment, customer communication device 208 is connected to one of resources 212 via components entirely hosted by a cloud-based service provider, wherein processing and data storage elements may be dedicated to the operator of contact center 202 or shared or distributed amongst a plurality of service provider customers, one being contact center 202.

Figure 3:
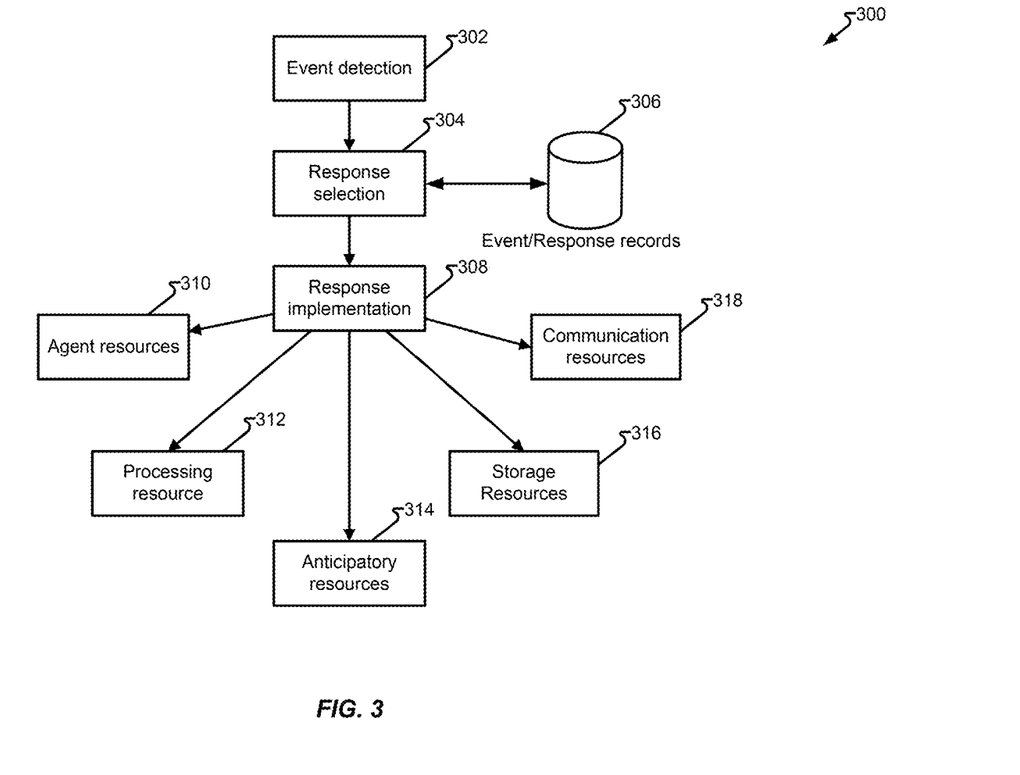
FIG. 3 depicts a block diagram in accordance with embodiments of the present disclosure.

FIG. 3 depicts block diagram 300 in accordance with embodiments of the present disclosure. In one embodiment, process 302 performs event detection. A server (e.g., computer comprising at least one processor), a plurality of servers, or other computing resource may monitor sources, such as social media server 230, other external data sources 234, and/or other external sources for events. Additionally or alternatively, process 302 may examine the content of incoming communications for cues on a particular event. For example, a traveler who was just turned away from boarding a plane or ship may initiate a communication to resolve the issue and thereby be a first indication that an event has occurred. One or more confirming indications may be required before taking action. As a further embodiment, a server may initiate inquiries specifically targeted to the suspected event, such as determining if the airline or cruise line has issued any notifications on their website, is still operating normally, etc. As described more completely with respect to FIG. 1, not all events will impact the operation of the system, such as contact center 202, and may result in no action taken. Additionally or alternatively, a domain of events may be, or not be, relevant. For example, the domain of air travel may be minimally, if at all, affected by a pipeline workers strike.

Process 304 determines a response, which may comprise accessing event/response records block 306, such as may be performed by a computing resource performing step 106 of process 100. Block 308 then implements the response. Response implementation block 308 may be one or more servers, robots, subsystems, etc. that allocate and/or configure hardware components of system 202. Response implementation block 308 may "wake" idle or offline components, add additional components that were previously allocated for other tasks, and/or reconfigure components to perform the selected response.

In one embodiment, response implementation block 308 triggers agent resources block 310 to be allocated and/or reconfigured to accommodate the selected response. For example, response implementation block 308 may cause additional agent resources to be allocated, configure endpoints to address the event, discontinue/decrease tasks unrelated to the selected response, change a type of tasks in accordance with the selected response (e.g., allocate additional bandwidth for video-based interactions, establish/maintain a connection to another data source, reconfigure the operation of the endpoint, etc.).

In another embodiment, response implementation block 308 triggers processing resource block 312 to be allocated and/or reconfigured to accommodate the selected response. In one embodiment, processors (e.g., as embodied in servers, blades, distributed systems, "cloud" platforms, etc.) are allocated to perform additional computational tasks that may result from the candidate event. Processors may be general purpose processors or specialized processors (e.g., graphical processing units "GPU").

In another embodiment, response implementation block 308 triggers communication resource block 318 to be allocated and/or reconfigured to accommodate the selected response. In one embodiment, communication resource block 318 may allocate additional connection resource (e.g., switches, trunks, etc.) and/or reconfigure existing hardware (e.g., enable calls related to the incident to be advanced out-of-turn to connect to an endpoint of an agent sooner than other types of calls), handle media types likely needed to handle the communication types (e.g., allocate more resource to text and audio and fewer/lower capacity resource for video, etc.).

In another embodiment, response implementation block 308 triggers storage resource block 316 to be allocated and/or reconfigured to accommodate the selected response. In one embodiment, storage resource block 316 may allocate additional resources and/or reconfigure existing resources. For example, a candidate event may cause customers to inquire into data that, due to pre-event optimization is kept in physical media, such as magnetic tape. However, as such information is predicted to be known, such as by step 116, the data may be cached into faster memory.

In another embodiment, response implementation block 308 triggers anticipatory resource block 314 to be allocated and/or reconfigured to accommodate the selected response. In one embodiment, anticipatory resource block 314 may comprise one or more other blocks (e.g., agent resource block 310, processing resource 312, storage resource 316, communication resource 318. Anticipatory resource block 314 may cause one or more of the aforementioned blocks to be reconfigured to imitate a communication between an endpoint of the system (e.g., resource 112) to an endpoint of a customer (e.g., customer communication device 208). For example, anticipatory reconfiguration 314 may require generic or customer-specific information be retrieved from a database 218 and/or other resource, requiring reconfiguration/allocation of storage resources 316, additional and/or reconfigured communications block 318 in order to provide relevant information to the customer's endpoint. Additionally or alternatively, the customer may be presented with options or other choices that require a communication and, in response or anticipation thereto, cause response implementation block 308 to perform additional, different, or supplemental modifications to accommodate the replies. In the case of outbound voice calls, an agent's endpoint may be configured to have relevant information and/or options prior to a communication allocation to connect the agent's endpoint to the customer's endpoint.

A particular solution, determined in step 116, may comprise a plurality of blocks 310-318.

Figure 4:
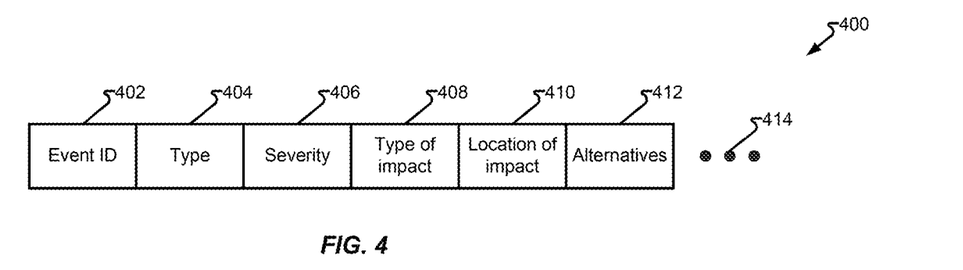
FIG. 4 depicts a first data structure in accordance with embodiments of the present disclosure.

FIG. 4 depicts data structure 400 in accordance with embodiments of the present disclosure. In one embodiment, one or more data structures 400 may be accessed, such as by a processor executing test 104, to determine if a detected event is a candidate event and/or if an event is a sufficient match to a historic event, (e.g., step 106-110). Data structure 400 may include more records, such as indicated by ellipses 414, or fewer records. Records of data structure 400 may include event identifier 402, such as a unique number or other identifier of the particular data structure 400; type identifier 404 to identify a category, subcategory, or other attribute of the event (e.g., natural disaster, terrorist attack, weather, etc.); severity 406 may be utilized to indicate the severity of a particular event (e.g., category 5 hurricane, earthquake of 1.6 magnitude, minor weather incident, etc.); type of impact 408 may be utilize to categorize the type of impact (e.g., all travel, air travel, all operations, international travel, beachfront hotels, etc.); location of impact 410 may be utilized to categorize the location or area of the event (e.g., widespread power outage, flooding along the river, nation-wide rail strike, etc.); alternatives 412 may be utilized to indicate mitigating or enhancing factors (e.g., minor flooding but a major roadway is underwater, flights to the Canary Islands cancelled but additional passenger ships available from southern Morocco, etc.).

It should be appreciated that data structure 400 is illustrated as a "flat file" for one event but other data structures, for one or a plurality of events, comprising the same or similar information may be utilized without departing from the scope of the disclosure. Also, step 124 may cause a new data structure 400 to be wrote for a current candidate event to then become a member of the stored events of step 106 (see, FIG. 1).

Figure 5:
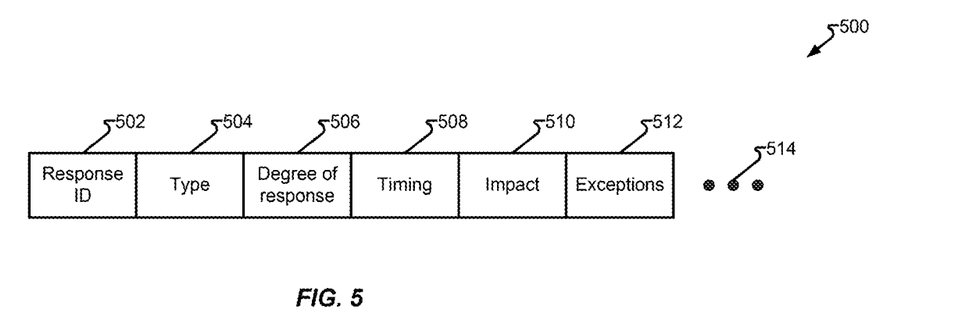
FIG. 5 depicts a second data structure in accordance with embodiments of the present disclosure.

FIG. 5 depicts data structure 500 in accordance with embodiments of the present disclosure. In one embodiment, one or more data structures 500 may be accessed, such as by a processor executing step 116, to determine a solution to a candidate event. Data structure 500 may include more records, such as indicated by ellipses 514, or fewer records. Records of data structure 500 may include response identifier 502, such as to provide a unique identifier of a particular data structure 500; type identifier 504, such as to provide a category or description of a response type (e.g., launch proactive outbound communication campaign, increase communication capacity, decrease video communication capacity, etc.); degree of response type 506, such as to indicate magnitude of response (e.g., increase communication capacity 10%, additional 35% processing demand, etc.); timing 508 (e.g., call travelers with flights leaving in the next day within the next 15 minutes; have communication capacity increased within the next 24 hours, etc.); impact 510 (e.g., video resources will become impaired/unavailable, agent endpoints will be utilized an additional 22%, etc.); exceptions 512 (e.g., automatic or manual entry of differences not otherwise accounted for).

It should be appreciated that data structure 500 is illustrated as a "flat file" for one event but other data structures, for one or a plurality of events, comprising the same or similar information may be utilized without departing from the scope of the disclosure. Also, step 124 may cause a new data structure 500 to be wrote for a current candidate event to then become a member of the stored events of step 106 (see, FIG. 1). Additionally or alternatively, data structures 400 and 500 may be combined into a single flat file or other structure.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose microprocessor (e.g., GPU, CPU), or logic circuits programmed with the instructions to perform the methods (e.g., FPGA). In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention.

Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
   at least one microprocessor:
   a memory accessible to the at least one microprocessor and storing instructions for execution by the at least one microprocessor:
   wherein the at least one microprocessor executes instructions as a portion of a plurality of resources,
   wherein, the at least one of the plurality of resources comprises a computing resource, a communication resource further comprising a first network interface to a network and selectively enabling communications between a first and second endpoint utilizing the network, or a data storage resource, and wherein the plurality of resources are interconnected for communications therebetween and enable the first endpoint to obtain or provide data to the second endpoint;

an event monitor comprising a second network interface to the network, wherein the event monitor obtains event information from an event source regarding an event;

an event assessment component, wherein the event assessment component determines whether the obtained event information matches a historic event in the data storage resource; and an event response processor, wherein the event response processor reconfigures the system in accordance with a solution determined from a historic solution associated with the historic event.

2. The system of claim 1, wherein the event response processor reconfigures the system comprising, adding at least one unallocated resource, not within the plurality of resources, to become one of the plurality of resources.

3. The system of claim 1, wherein the event response processor reconfigures the system comprising, causing at least one operational parameter of at least one of the plurality of resources to enable the first endpoint, not previously able to communicate with a third endpoint, to communicate with the third endpoint.

4. The system of claim 3, wherein the second endpoint and the third endpoint differ in one or more of media type, automated versus human-generated communication content, or real-time versus non-real-time communication type.

5. The system of claim 1, further comprising:
a number of endpoints in addition to the first and second endpoints; and
wherein the system enables the at least one endpoint, of the number of endpoints, to obtain or provide data to at the least one other endpoint, of the number of endpoints, in a first mode and, after the event response processor reconfigures the system enables the at least one endpoint to obtain or provide data to at the least one other endpoint, of the number of endpoints, in a second mode different from the at least one other endpoint utilized in from the first mode.

6. The system of claim 1, further comprising:
a number of endpoints in addition to the first and second endpoints; and
wherein the system enables the at least one endpoint, of the number of endpoints, to obtain or provide data to at the least one other endpoint, of the number of endpoints, in a first mode and, after the event response processor reconfigures the system enables the at least one endpoint to obtain or provide data to at the least one additional endpoint different from the at least one other endpoint utilized in the first mode.

7. The system of claim 1, wherein the solution comprises the second endpoint initiating a communication with the first endpoint.

8. The system of claim 1, wherein the at least one microprocessor further executes instructions as a portion of an evaluation component and wherein the evaluation component compares the expected performance of the system during the event with an observed performance of the system during the event and causes the solution to be stored with an associated actual-observed performance delta.

9. The system of claim 1, wherein indicia of the obtained event information and solution is stored in the data storage resource as an additional historic event and associated historic solution.

10. The system of claim 1, wherein:
the data storage resource maintains, with the historic event and historic solution, an actual-observed performance delta indicating a difference in the performance of the system as observed during the historic event while the system was configured in accordance with the historic solution versus the expected performance of the system; and
the event response processor further determines the solution in accordance with an actual-observed performance delta associated with the historic event.

11. A method, comprising:
utilizing a plurality of resources to provide connectivity between a first and second endpoint, wherein at least a portion of the plurality of resources comprise at least one of a computer resource, each of the at least one computer resource comprising a microprocessor and a memory for storing instructions for execution by the microprocessor, a communication resource comprising a first network interface to a network and selectively enabling communications utilizing the network, or a data storage resource, and wherein the plurality of resources are interconnected for communications therebetween and selectively enable the first endpoint to obtain or provide data to the second endpoint;
obtaining event information from an event source via a second network interface to the network regarding an event;
determining whether the obtained event information matches a historic event; and
automatically reconfiguring the plurality of resources in accordance with a solution determined from a historic solution associated with the historic event.

12. The method of claim 11, wherein reconfiguring the plurality of resources comprises adding at least one unallocated resource, not within the plurality of resources, to become one of the plurality of resources.

13. The method of claim 11, wherein reconfiguring the plurality of resources comprises causing at least one operational parameter of at least one of the plurality of resources to enable the first endpoint, not previously able to communicate with a third endpoint, to communicate with the third endpoint.

14. The method of claim 13, wherein the second endpoint and the third endpoint differ in one or more of media type, automated versus human-generated communication content, or real-time versus non-real-time communication type.

15. The method of claim 11, wherein the solution comprises the second endpoint initiating a communication with the first endpoint.

16. The method of claim 11, further comprising storing indicia of the obtained event information and solution is stored in a data repository as an additional historic event and associated historic solution.

17. The method of claim 11, further comprising:
maintaining an actual-observed performance delta indicating a difference in the performance of the resources as observed during the historic event while the resources were configured in accordance with the historic solution versus the expected performance of the resources; and the event response processor further determines the solution in accordance with an actual-observed performance delta associated with the historic event.

18. A system, comprising:
a plurality of resources, wherein at least a portion of the plurality of resources comprise at least one of a computer resource comprising a microprocessor and a memory for storing instructions for execution by the microprocessor, a communication resource comprising a network interface to a network and selectively enabling communications between a first and second endpoint utilizing the network, or a data storage resource, and wherein the plurality of resources are interconnected for communications therebetween and enable the first endpoint to obtain or provide data to the second endpoint;
means to obtain event information from an event source via a second network interface to the network regarding an event;
means to determine whether the obtained event information matches a historic event in the data storage resource; and
means to reconfigure the resources in accordance with a solution determined from a historic solution associated with the historic event.

19. The system of claim 18, wherein the means to obtain event information from an event source regarding an event, further comprise means to monitor event information from the event source.

20. The system of claim 18, further comprising:
means to maintain the historic event and historic solution, an actual-observed performance delta indicating a difference in the performance of the system as observed during the historic event while the system was configured in accordance with the historic solution versus the expected performance of the system; and
wherein means to further determine the solution in accordance with an actual-observed performance delta associated with the historic event.

* * * * *

UNITED STATES PATENT AND TRADEMARK OFFICE
CERTIFICATE OF CORRECTION

PATENT NO. : 10,735,258 B2
APPLICATION NO. : 16/043452
DATED : August 4, 2020
INVENTOR(S) : Kezzia Porter et al.

It is certified that error appears in the above-identified patent and that said Letters Patent is hereby corrected as shown below:

In the Claims

At Column 20, Line 60, please delete ":" and insert --;-- therein.

At Column 20, Line 63, please delete ":" and insert --;-- therein.

At Column 21, Line 46, please delete "from".

Signed and Sealed this
Fifteenth Day of September, 2020

Andrei Iancu
*Director of the United States Patent and Trademark Office*